UNITED STATES PATENT OFFICE.

CHARLES F. MILLER, OF LANCASTER, PENNSYLVANIA.

IMPROVED FIRE AND WATER PROOF TRAVELING-TRUNK.

Specification forming part of Letters Patent No. 798, dated June 20, 1838.

*To all whom it may concern:*

Be it known that I, CHARLES F. MILLER, of the city of Lancaster and State of Pennsylvania, have invented a new and Improved Traveling-Trunk, Fire and Water Proof; and I do hereby declare that the following is a full and exact description.

I make two sheet-iron forms of the trunk, the one so much less than the other that when the lesser is placed within the larger it leaves a space between the two in all parts of about three-fourths of an inch. This opening or space between the forms must be carefully filled up with a composition of materials that will resist both fire and water, and will hereinafter be described. The outer case of the lid must extend about three-fourths of an inch farther down on the back part than the ends or front. This brings it to the place where I attach the hinges. I then put a thin coat of paste of the composition above alluded to on both inside and outside of the trunk—the inside to hold the lining and the outside the leathering of the trunk. The upper edge of the trunk is then covered with a strip of sheet-iron extending a small distance down in the inside and about an inch on the outside over the leather. This strip is sunk in the center in the form of a groove. The lid is in the same manner edged, but with this difference, that the center protrudes in the form of a tongue to fit this groove, and these are fastened on by means of small screws. I then put a rim of sheet-iron of about an inch and one-half in depth on the front and ends of the lid, so as to fit close to the trunk.

The composition is made by taking equal quantities of pulverized chalk and curd of thick milk, bones of animals burned and pulverized, then boiled in urine until the quantity is lessened one-third, and the best kind of asbestus pulverized. Let the proportions be about one-sixth of the first, two-sixths of the next, and three of the third. To this add whites of eggs and blood sufficient to make it into a paste of a proper consistency, and apply this as above directed.

What I claim as my invention, and desire to secure by Letters Patent, is—

The manufacturing of chests and trunks of double bodies of sheet-iron and filling the space between the two with the within-named composition, or with any other possessing analogous properties, in the manner described.

CHARLES F. MILLER.

Witnesses:
ARTHUR W. MALLON,
SAML. DALE.